US011919675B2

(12) United States Patent
Munaro et al.

(10) Patent No.: US 11,919,675 B2
(45) Date of Patent: Mar. 5, 2024

(54) MULTI-PURPOSE COLLAPSIBLE BIN

(71) Applicants: Rafael Munaro, Hawthorne, CA (US); Anthony Dittmann, San Diego, CA (US)

(72) Inventors: Rafael Munaro, Hawthorne, CA (US); Anthony Dittmann, San Diego, CA (US)

( * ) Notice: Subject to any disclaimer, the term of this patent is extended or adjusted under 35 U.S.C. 154(b) by 160 days.

(21) Appl. No.: 17/530,948

(22) Filed: Nov. 19, 2021

(65) Prior Publication Data

US 2022/0153475 A1 May 19, 2022

Related U.S. Application Data

(63) Continuation-in-part of application No. 16/433,378, filed on Jun. 6, 2019, now abandoned.

(60) Provisional application No. 62/757,435, filed on Nov. 8, 2018.

(51) Int. Cl.
*B65F 1/06* (2006.01)
*B65D 21/08* (2006.01)
*B65D 25/30* (2006.01)
*B65F 1/16* (2006.01)

(52) U.S. Cl.
CPC ........... *B65D 21/086* (2013.01); *B65D 25/30* (2013.01); *B65F 1/06* (2013.01); *B65F 1/1646* (2013.01); *B65F 2220/101* (2013.01); *B65F 2220/1063* (2013.01); *B65F 2250/114* (2013.01)

(58) Field of Classification Search
CPC ............... B65D 11/1853; B65D 21/086; B65F 2220/101; B65F 2220/1063; B65F 1/1646; B65F 1/06; B65F 2220/106
USPC .......................................................... 220/908
See application file for complete search history.

(56) References Cited

U.S. PATENT DOCUMENTS 2,406,756 A * 9/1946 Fox .................... B65D 71/0011 206/202
2,515,876 A 7/1950 Kauffman
5,564,599 A 10/1996 Barber et al.
6,112,928 A * 9/2000 Black ..................... B65D 1/225 220/6
6,938,789 B1 * 9/2005 Matias ................. B65D 11/184 220/6
7,703,632 B2 * 4/2010 Kochanowski ...... B65D 88/522 220/666
8,240,621 B1 * 8/2012 Singh ..................... B65D 25/16 220/495.11
2010/0048122 A1 * 2/2010 Uto ........................ B60J 5/0497 454/195
2011/0215205 A1 9/2011 Sutphen
(Continued)

FOREIGN PATENT DOCUMENTS

EP 1705136 9/2006
JP 2003267502 9/2003
(Continued)

*Primary Examiner* — Stephen J Castellano
(74) *Attorney, Agent, or Firm* — Lewis Kohn & Walker LLP; David M. Kohn; Kari Moyer-Henry

(57) ABSTRACT

A reusable, multi-purpose collection bin for waste collection, particularly at special events requiring waste collection such as concerts, festivals, sporting events, and any other outdoor or indoor event where trash collection is desired. The bin easily contracts simply by pulling upward on the top panels through the grasping holes on the top of the bin.

16 Claims, 18 Drawing Sheets

(56) References Cited

U.S. PATENT DOCUMENTS

| | | | | |
|---|---|---|---|---|
| 2016/0101889 | A1* | 4/2016 | Massey, Jr. | D06F 95/002 229/117.01 |
| 2021/0361104 | A1* | 11/2021 | McLean | B65D 15/24 |

FOREIGN PATENT DOCUMENTS

| | | |
|---|---|---|
| WO | 20080018971 | 2/2008 |
| WO | 2018015470 | 1/2018 |

* cited by examiner

26

MULTI-PURPOSE COLLAPSIBLE BIN

RELATED APPLICATIONS

This application is a continuation-in-part patent application claiming the benefit of priority from U.S. patent application Ser. No. 16/433,378 filed Jun. 6, 2019, now abandoned, which claims the benefit of priority from Provisional Application Ser. No. 62/757,435 filed Nov. 8, 2018, the contents of which are incorporated by reference herein.

FIELD OF THE INVENTION

This application relates generally to the field of waste collection. Specifically, the invention relates to reusable, multi-purpose collection bins for waste collection, particularly at special events requiring waste collection such as concerts, festivals, sporting events, and any other outdoor or indoor event where trash collection is desired. In addition, other industries that operate in a temporary or permanent environment or location would be interested in this invention including, but not limited to; the construction industry, oil and gas exploration, resorts and ski resorts, city municipalities, schools, universities and parks, stadiums and arenas, as well as the hotel/hospitality industry. Some companies in particular would be attracted to the product, particularly ones that provide site service equipment, including but not limited to rental and sales divisions online or brick and mortar, or hardware stores, online or brick and mortar.

BACKGROUND OF THE INVENTION

The current product used in the applications above is substandard. It is typically made of a cardboard and has a litany of inherent flaws. The cardboard units topple in light winds and they disintegrate in rain, snow or any water event (sprinkler spray, power washing, and any rogue manifestation of water). Often, a rock is used to weight the unit down to counter wind. When staff attempts to relocate these units, often they blow out the bottom from the weight of the refuse that has been disposed, or even from the rock expected to ballast the unit. The trash can liner rarely fastens well to the rim of the square shaped cardboard unit, as no fastener exists in these temporary units. An awkward cardboard lid is often pushed on top of the bin, but is never stable. Post event, these temporary bins unfortunately convert rubbish themselves and are thrown away, impacting landfills.

SUMMARY OF THE INVENTION

The present invention provides a multi-purpose bin comprising: a) a top piece; b) a bottom piece; and c) a plurality of side pieces wherein the plurality of side pieces are substantially rectangular in shape wherein the height of each side piece is greater than the width of each side piece.

In one aspect, the present invention provides a bin for collection of trash and/or recycling comprising a means for receiving a removable collection bag or liner. The invention is capable of holding one bag for one particular identified stream (trash or recycling) and dual streams in one bin (trash in one compartment/liner and recycling in the other compartment/liner).

In another aspect, the present invention folds in half, able to decrease its width by less than 10% of the expanded form for easy transport and storage. The unit easily contracts simply by pulling upward on the top pieces through the hand holds and with this motion, the unit automatically and effortlessly collapses.

In another aspect, there are spaces/voids strategically cut out of the panels to create handles when the bin is expanded of contracted for easy transport.

In another aspect, the present invention provides a bin wherein the top piece locks to the body of the bin thereby preventing spilling of the contents in the event the bin tips over. This top piece also protects the refuse from fowl and other animals.

In yet another aspect, the present invention provides a bin wherein the top piece, the bottom piece and a plurality of side pieces are comprised of a central hinge thereby allowing for the folding of the bin in half.

In one aspect, the present invention has the weight and durability to withstand all of the challenges of the existing bins, including a fastener for the trash can liners.

These features, as well as various, alternative embodiments, will be apparent from a reading of the following detailed description of the present invention.

BRIEF DESCRIPTION OF THE DRAWINGS

The novel features of the present invention are set forth herein embodied in the form of the claims of the invention. Features and advantages of the present invention may be best understood by reference to the following detailed description of the invention, setting forth illustrative embodiments and preferred features of the invention, as well as the accompanying drawings, of which:

DETAILED DESCRIPTION OF THE INVENTION

Described herein are reusable bins. More specifically, described are recycling and/or trash bins that are reusable, collapsible, washable and easily portable.

Figures 1A, 1B, 1C, 1D:
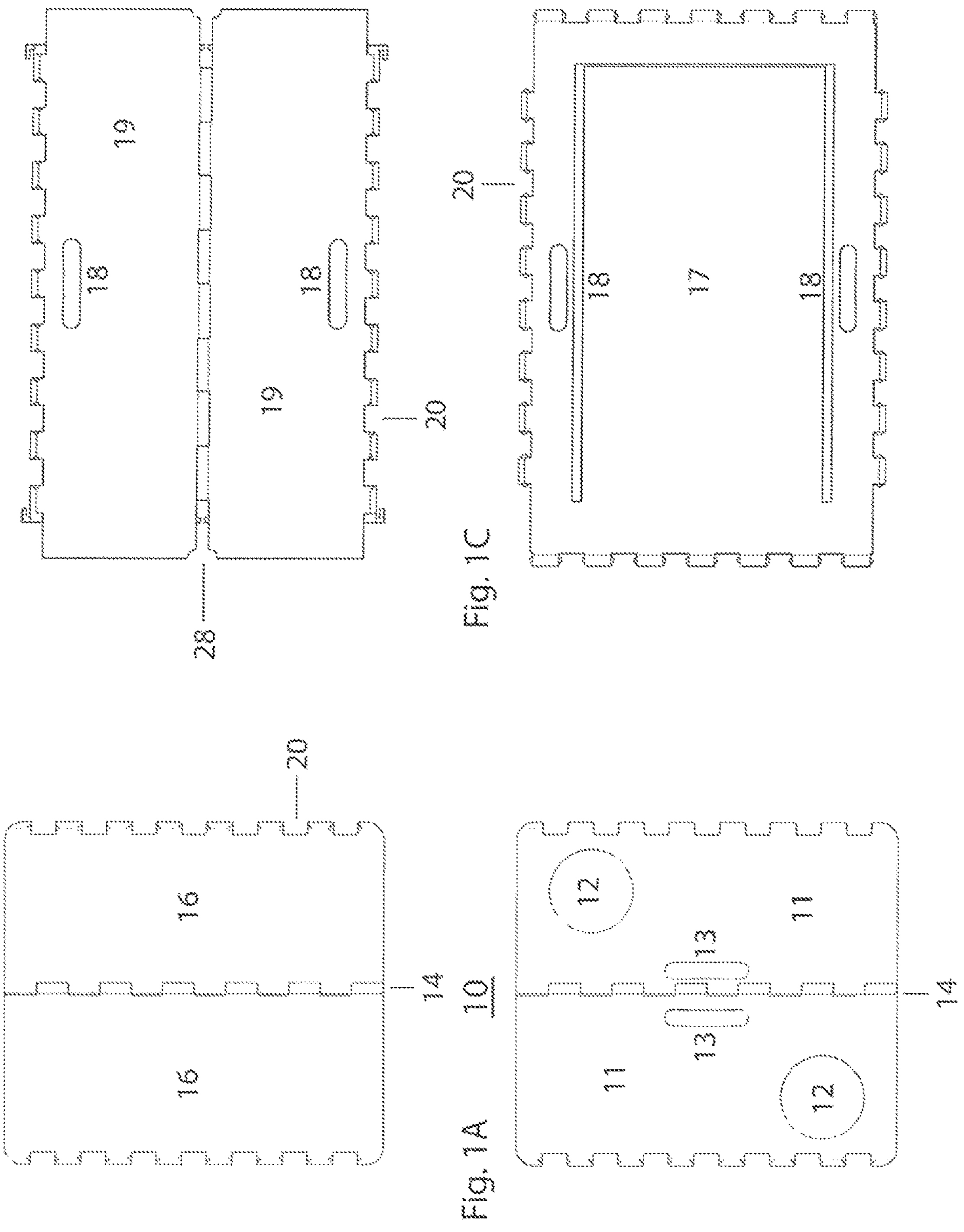
FIG. 1A-1D show the components and relative dimensions of the square bin design.

With reference to FIG. 1A, shown is a top piece 10 for a square bin wherein the top piece 10 is bisected into two halves 11 by a horizontal hinge 14 positioned therein and further comprises a plurality of hinge component 20 on each of the opposing ends parallel to the horizontal hinge 14. At least one opening 12 is provided for the deposit of materials into the square bin. The top piece 10 also includes two small cutouts 13 positioned one on each side of the horizontal hinge 14 which serve as a handle. FIG. 1B shows the bottom piece 15 of the square bin wherein the bottom piece 15 is bisected into two halves 16 by a horizontal hinge 14 and further comprises a plurality of hinge component 20 on each of the opposing ends parallel to the horizontal hinge. FIG. 1C shows a first side piece 17 for a square bin wherein the side piece 17 includes a hinge component 20 on each of the four sides of the piece. The side piece may include a plurality of cutouts 18. FIG. 1D shows a second side piece for a square bin wherein the side piece is bisected into two halves 19 by a vertical hinge 28 positioned centrally therein and further comprises a hinge component 20 on each of the opposing sides parallel to the vertical hinge 28. The side piece may include a plurality of cut outs 18.

Figure 2A:
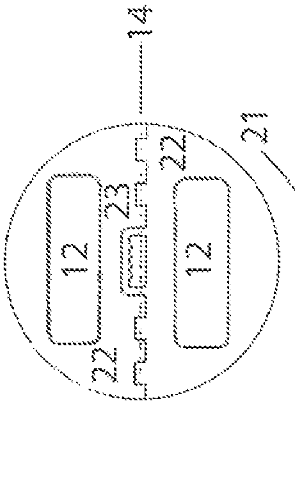
FIG. 2A-2D show the components and relative dimensions of the rounded bin design.
Figure 2B:
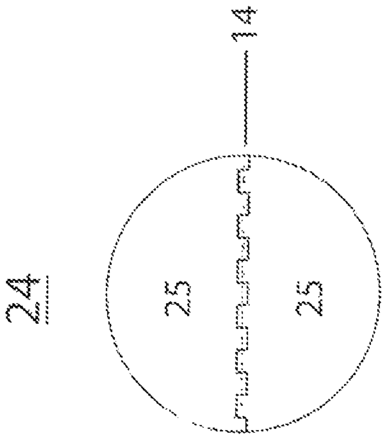
Figure 2C:
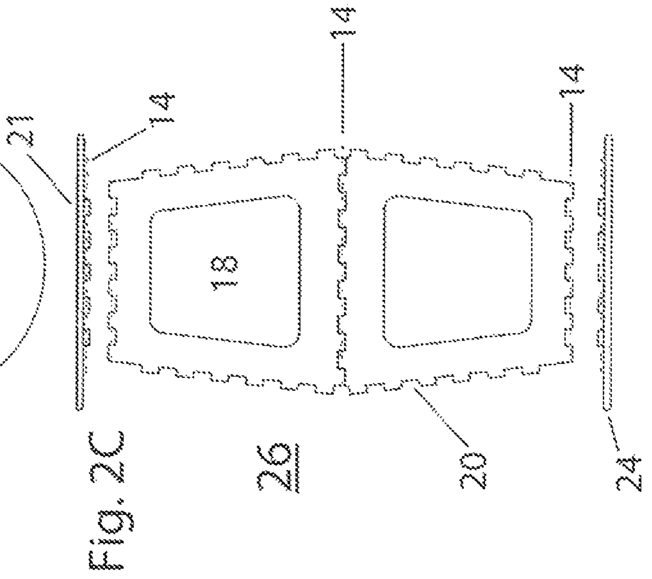
Figure 2D:
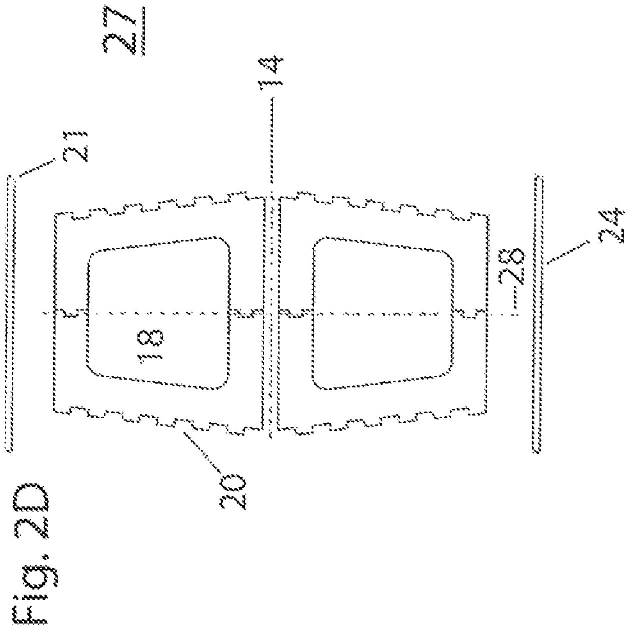

With reference to FIG. 2A, shown is a top piece 21 for a rounded bin wherein the top piece 21 is bisected into two halves 22 by a horizontal hinge 14 positioned centrally therein and further comprises a plurality of hinge components 20 (not shown) on the underside of the top piece 21 positioned on each side of the horizontal hinge 14. At least one cutout 12 is provide for the deposit of materials into the round bin. The top piece 21 also includes a small opening 23 positioned along horizontal hinge 14 which serves as a handle. FIG. 2B shows the bottom piece 24 of the rounded bin wherein the bottom piece is bisected into two halves 25 by a horizontal hinge 14 positioned centrally therein and further comprises a plurality of hinge components 20 (not shown) on the topside of the bottom piece positioned on each side of the horizontal hinge 14. FIG. 2C shows a first side piece 26 for a rounded bin wherein the side piece 26 includes a hinge component 20 on each outer edge of the side piece 26. The side piece 26 is bisected by a horizontal hinge positioned centrally therein and may include a plurality of cutouts 18. FIG. 2D shows a second side piece 27 for a rounded bin wherein the side piece 27 is bisected by a vertical hinge 28 and further comprises a plurality hinge component 20 on each of the opposing sides parallel to a horizontal hinge. The side piece may include a plurality of openings.

Figure 3B:
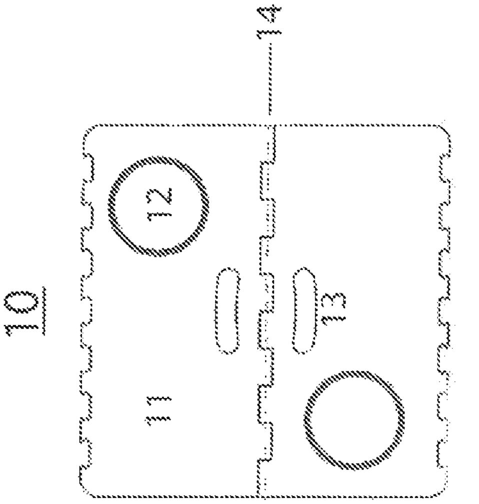
FIG. 3A-3D show examples of various openings in the top surface of a bin.
Figure 3D:
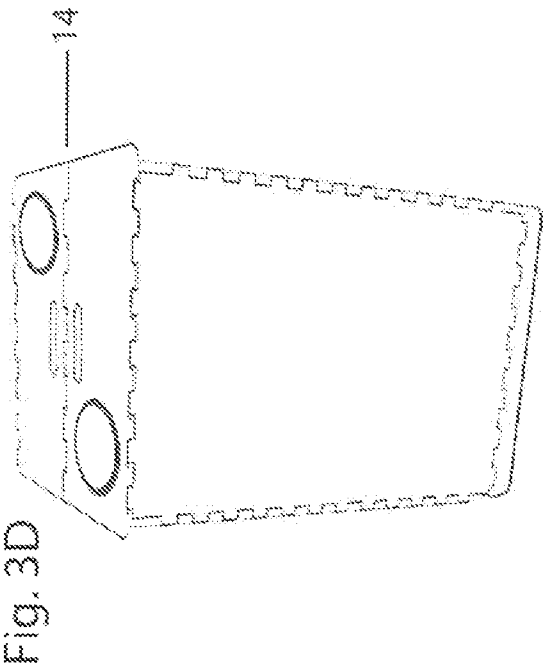
Figure 3A:
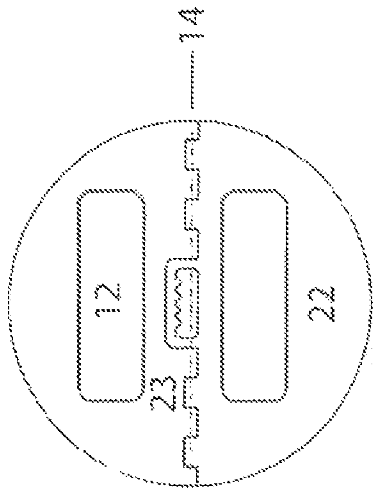
Figure 3C:
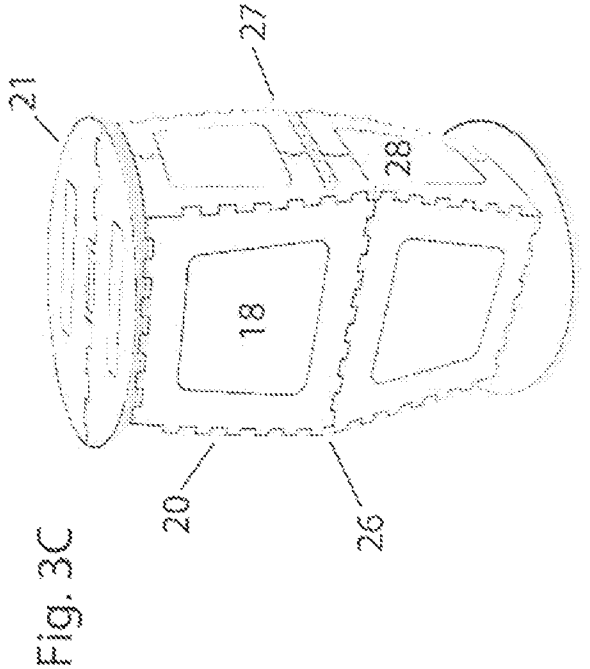

With reference to FIG. 3A, shown is a top piece 21 for a rounded bin wherein the top piece 21 is bisected into two halves 22 by a horizontal hinge 14 positioned centrally therein. At least one cutout 12 is provided for the deposit of materials into the round bin. The top piece 21 also includes a small opening 23 positioned along horizontal hinge 14 which serves as a handle. By way of example only, the cutouts 12 shown are essentially rectangular but may be any shape desired to accommodate the deposit of items into the bin. FIG. 3B shows a top piece 10 for a square bin wherein the top piece 10 is bisected into two halves 11 by a horizontal hinge 14 positioned therein and further comprises a plurality of hinge component 20 on each of the opposing ends parallel to the horizontal hinge 14. By way of example only, the cutouts 12 shown are circular but may be any shape desired to accommodate the deposit of items into the bin. FIG. 3C shows an assembled bin comprising the pieces of FIG. 2A-2D. FIG. 3D shows an assembled bin comprising the pieces of FIG. 1A-1D. The assembled bin may further include a side panel 29 for inserting an information insert. Such inserts may provide instructions for use of the bin and/or advertising for events and/or products relating to where to rent and/or purchase the bins.

Figure 4B:
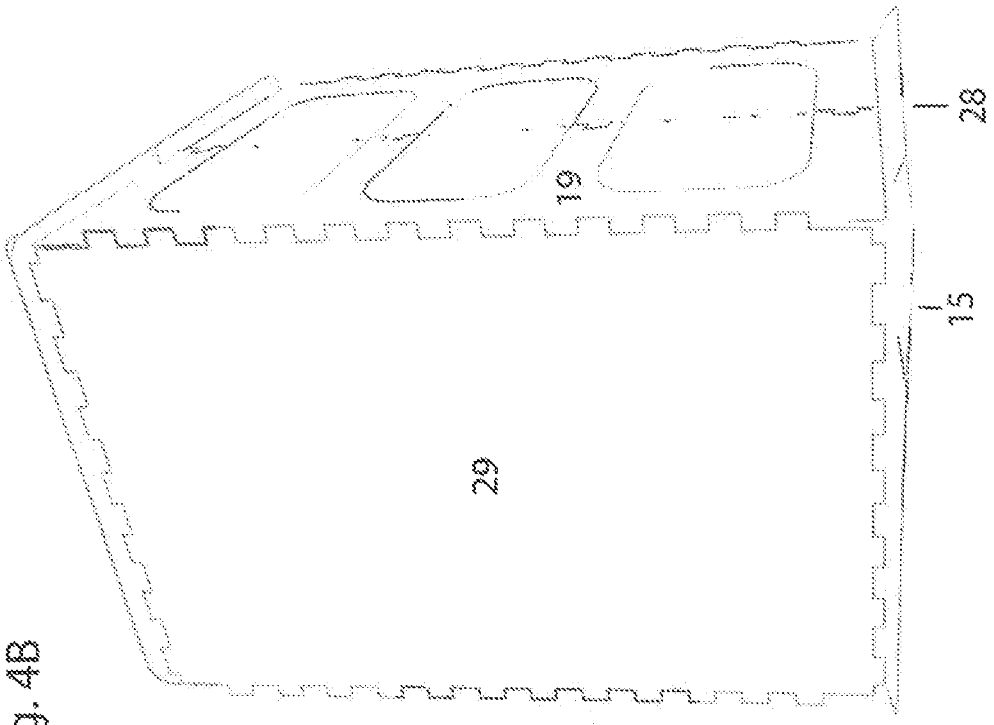
FIGS. 4A and 4B show examples of bins as fully expanded for use.
Figure 4A:
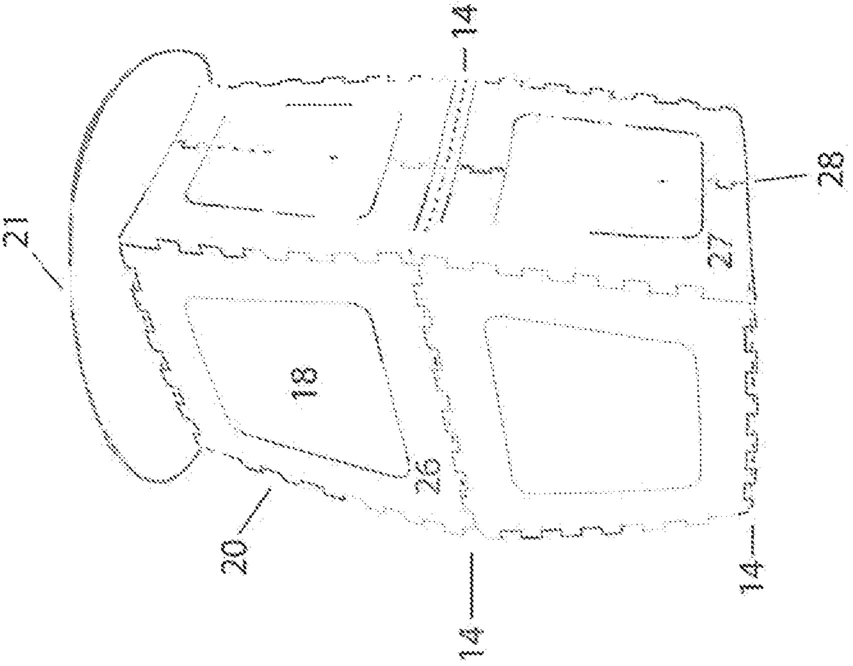

With regard to FIG. 4A, shown is a side perspective view of an exemplary round bin wherein the bin includes the ability of the side piece having a vertical hinge 28 to fold in half. Similarly, FIG. 4B shows a side perspective view of an exemplary square bin wherein the bin includes a means for at least one panel insert 29 on at least one side piece of the bin. The panel inserts may provide instructions for use of the bin and/or advertising for events and/or products relating to where to rent and/or purchase the bins. FIG. 4B further demonstrates the construction of the bin wherein the hinge components 20 on each side of the side piece are joined with the corresponding hinge components on each adjacent piece. The resulting completed hinges are series hinges capable of folding such that the bin may be flattened for ease of transport.

Figure 5B:
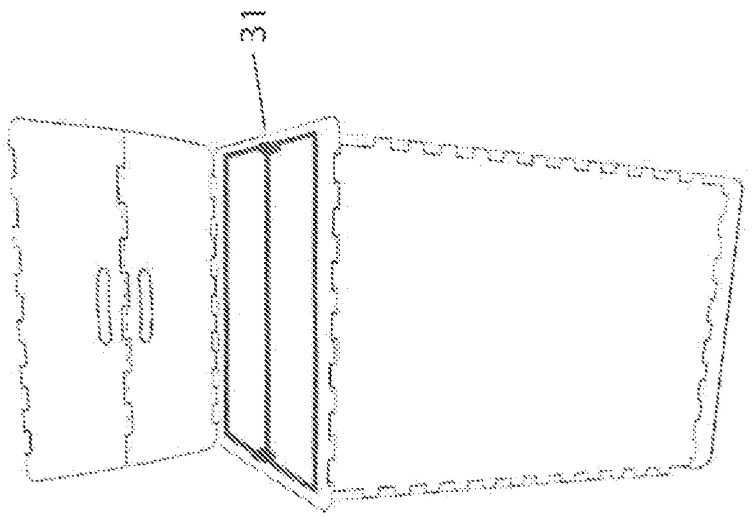
FIGS. 5A and 5B show alternative views of the bins shown in FIGS. 4A and 4B, respectively.
Figure 5A:
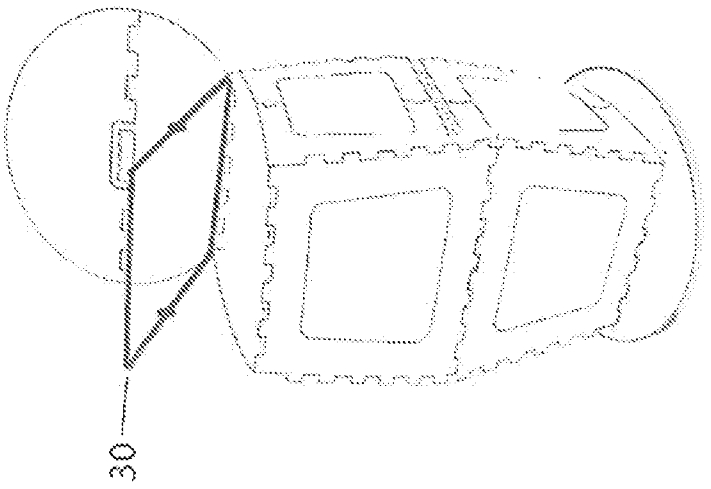
Figure 6B:
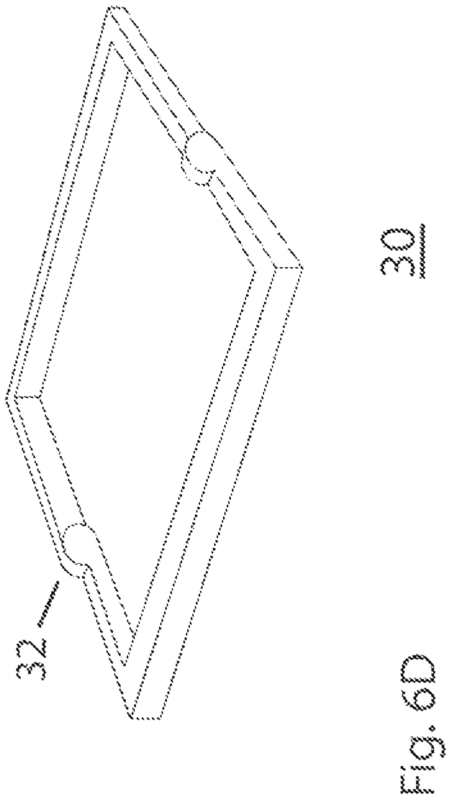
FIG. 6A-6D show the structure of the fasteners for trash bin liners.
Figure 6D:
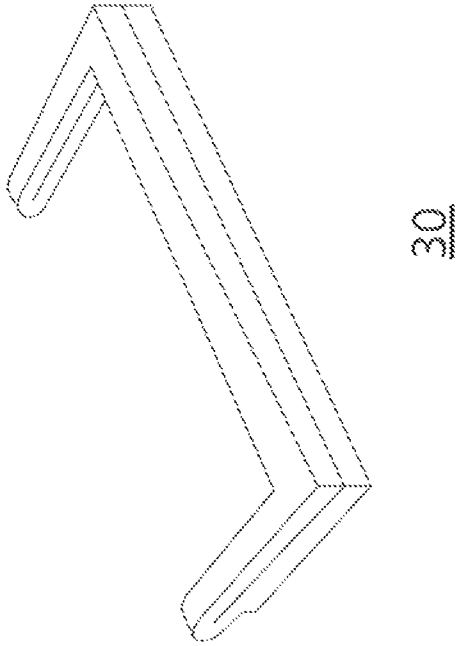
Figure 6A:
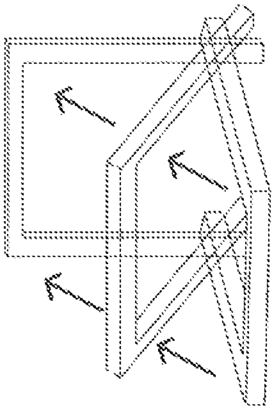
Figure 6C:
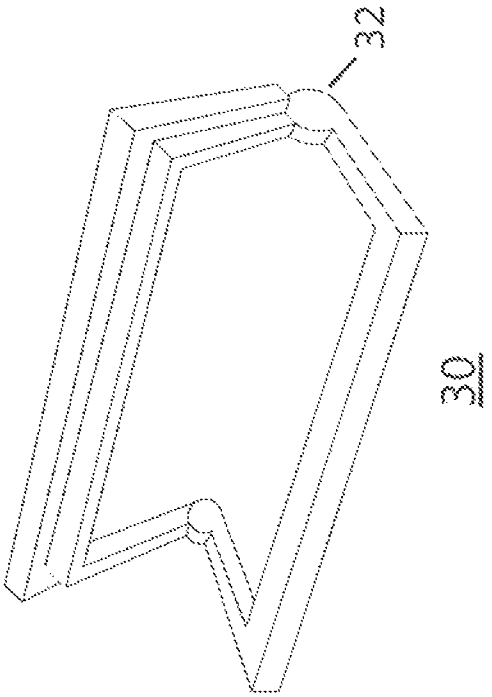

With regard to FIG. 5A, shown is a side perspective view of an exemplary round bin demonstrating the means by which the top piece is attached to the side pieces of the bin using series hinges. FIG. 5B shows the central hinge present on the side piece wherein the hinges are capable of folding such that the bin may be flattened for ease of transport. Also shown is an integrated fastener means comprising a gasket ring 30, 31 positioned under the top piece wherein the fastener means captures a liner bag to hold the liner securely in place during use. FIG. 6A-6D show the gasket ring 30 in various positions. FIG. 6A shows the functionality of the gasket 30, 31 and the rotation about the hinge 32 when the gasket 30 is attached to a side piece of the bin. Another option for bag fasteners are pothooks in which the bag(s) are situated around the rim and then fastened in each corner to pothooks that extrude from the panels.

Figure 7:
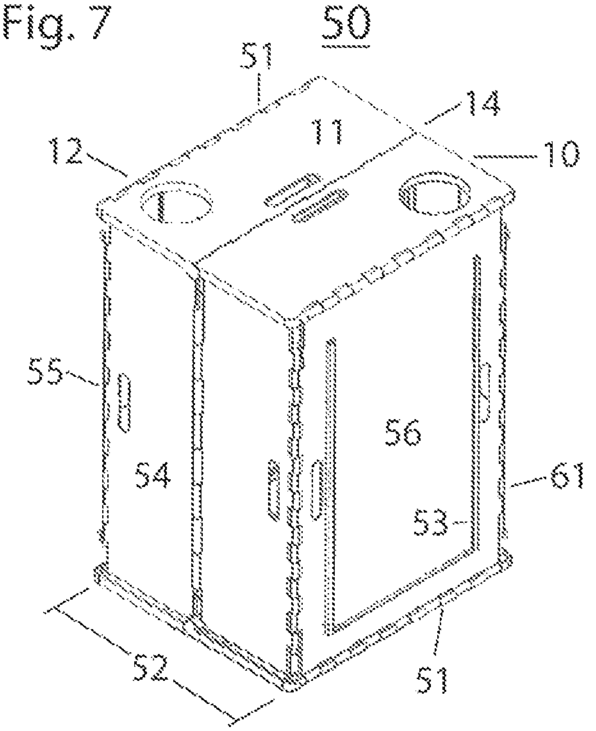
FIG. 7 shows a collapsible bin utilizing a pin assembly component.

With regard to FIG. 7, shown is a top perspective view of a fully enclosed bin 50, the bin 50 comprised of a top piece 10 wherein the top piece 10 is bisected into two halves 11 by a horizontal hinge 14 positioned therein and further comprises a plurality of interlocking hinge component 51 on each of the opposing ends parallel to the horizontal hinge 14. Interlocking hinge 51 is further comprised of hinge pins (not shown) to enable rotation of the interlocking hinge 51. Opposite of top piece 10 is bottom piece 52 wherein the bottom piece 52 is bisected by a horizontal interlocking hinge. Bottom piece 52 further includes a plurality of interlocking hinge components 51 on each of the opposing ends parallel to the horizontal interlocking hinge. The bin is further comprised of a two side piece 62 (see FIG. 9) and two side piece 63 (see FIG. 10). Side piece 62 and side piece 63 are connected by vertical interlocking hinge 61 which is further comprised of hinge pins.

Figure 8:
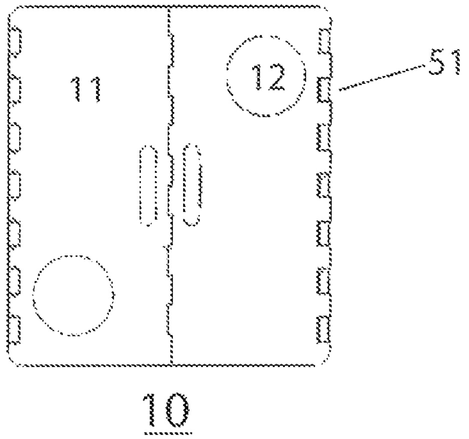
FIG. 8 shows the lid components of a collapsible bin.

With regard to FIG. 8, shown is a top view of top piece 10 as seen in fully enclosed bin 50 wherein the top piece 10 includes a plurality of interlocking hinge component 51 on each of the opposing ends. At least one cutout 12 is provided for the deposit of materials into the bin. Interlocking hinge 51 is further comprised of hinge pins (not shown) to enable rotation of the interlocking hinge 51.

Figure 9:
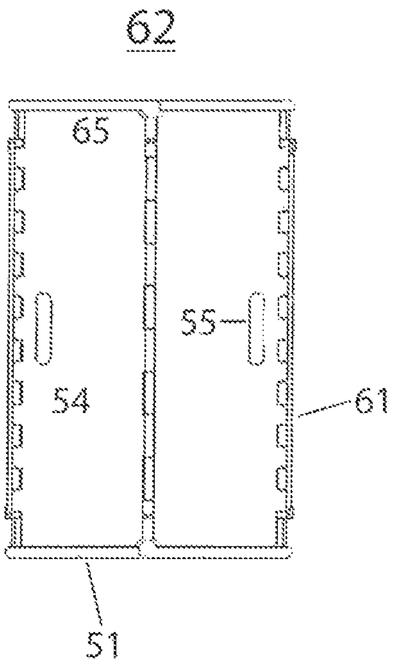
FIG. 9 shows the side components of a collapsible bin.

With regard to FIG. 9, shown is a side piece 62 as seen in fully enclosed bin 50 wherein the side piece 62 is bisected into two halves 54 by a vertical interlocking hinge 65 positioned therein and further comprises a plurality of interlocking hinge component 61 on each of the opposing ends parallel to the vertical interlocking hinge 65. Vertical interlocking hinge 65 is further comprised of hinge pins (not shown) to enable rotation of the interlocking hinge 65. Side piece 62 may further include cut outs 55 for use as handles when transporting bin 50.

Figure 10:
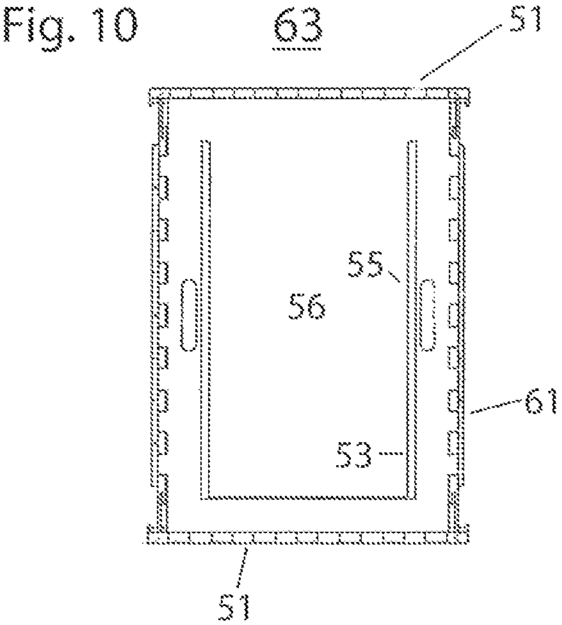
FIG. 10 shows alternative side components of a collapsible bin.

With regard to FIG. 10, shown is a side piece 63 as seen in fully enclosed bin 50 wherein side piece 63 further includes a plurality of interlocking hinge component 51 on each of the top and bottom and a plurality of interlocking hinge components 61 on each of the opposing sides. Side piece 63 may further include panel 56 for insertion of panels. Grooves 53 allow for the insertion and retention of potential informational panels. Upon assembly, adjacent side pieces 62, 63 are joined at vertical interlocking hinge present along the side of each side piece. Top piece 10 and bottom piece 15 are joined to side pieces 62, 63 at horizontal interlocking hinge 51 present on the side of each top, bottom, and side piece.

Figure 11:
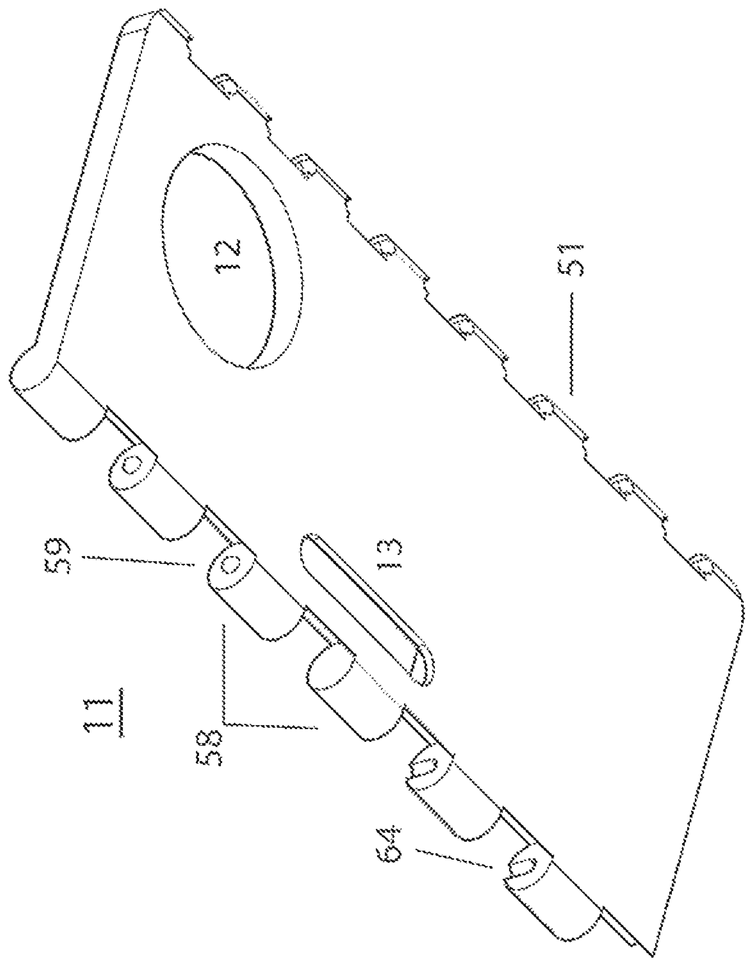
FIG. 11 shows an enlarged image of a lid component of a collapsible bin.

With regard to FIG. 11, shown is one half piece 11 of a top piece of a bin as shown in FIG. 7. The one half piece 11 is further comprised of a cutout 12 for deposit of materials into the bin and a small opening 13 for use as a handle. The side of one half piece 11 positioned closest to small opening 13 is further comprised of a plurality of a first type of hinge component 58 wherein hinge component 58 is further comprised of a protrusion 59 on one end of hinge component 58 and a groove 64 on the other end of hinge component 58. The opposite side of the one half piece 11 is comprised of a plurality of hinge components 51 which further include hinge pins (not shown).

Figure 12:
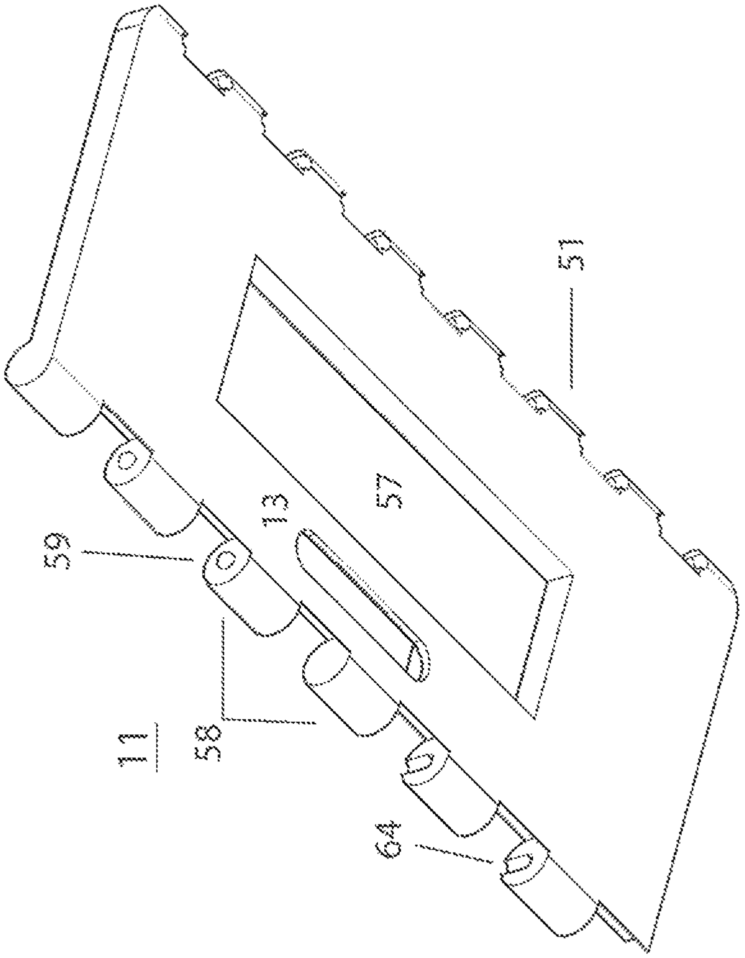
FIG. 12 shows an enlarged image of an alternative lid component of a collapsible bin.

With regard to FIG. 12, shown is one half piece 11 of a top piece of a bin. The one half piece 11 is further comprised of a cutout 57 for deposit of materials into the bin and a small opening 13 for use as a handle. The side of one half piece 11 positioned closest to small opening 13 is further comprised of a plurality of a first type of hinge component 58 wherein hinge component 58 is further comprised of a protrusion 59 on one end of hinge component 58 and a groove 64 on the other end of hinge component 58. The opposite side of the one half piece 11 is comprised of a plurality of hinge components 51 which further include hinge pins (not shown).

Figure 13:
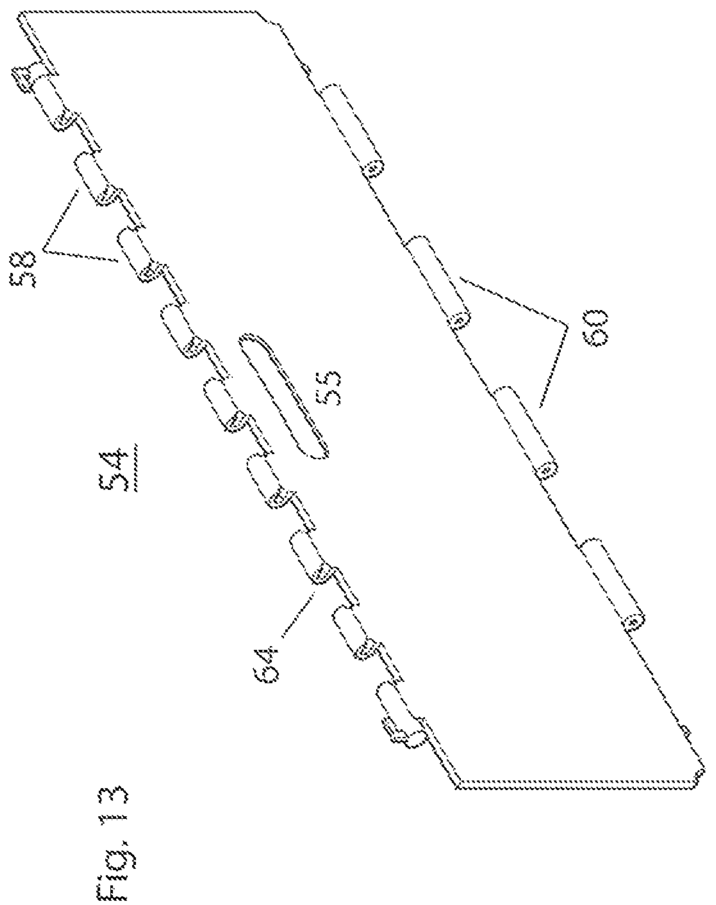
FIG. 13 shows an enlarged image of a side component of a collapsible bin.

With regard to FIG. 13, shown is one half piece 54 of a side piece of a bin as shown in FIG. 7. The one half piece 54 is further comprised of a small opening 55 for use as a handle. The side of one half piece 54 positioned closest to small opening 55 is further comprised of a plurality of a first type of hinge component 58 wherein hinge component 58 is further comprised of a protrusion (not shown) on one end of hinge component 58 and a groove 64 on the other end of hinge component 58. The opposite side of the one half piece 11 is comprised of a plurality of a second hinge component 60 which further include hinge pins (not shown).

Figure 14:
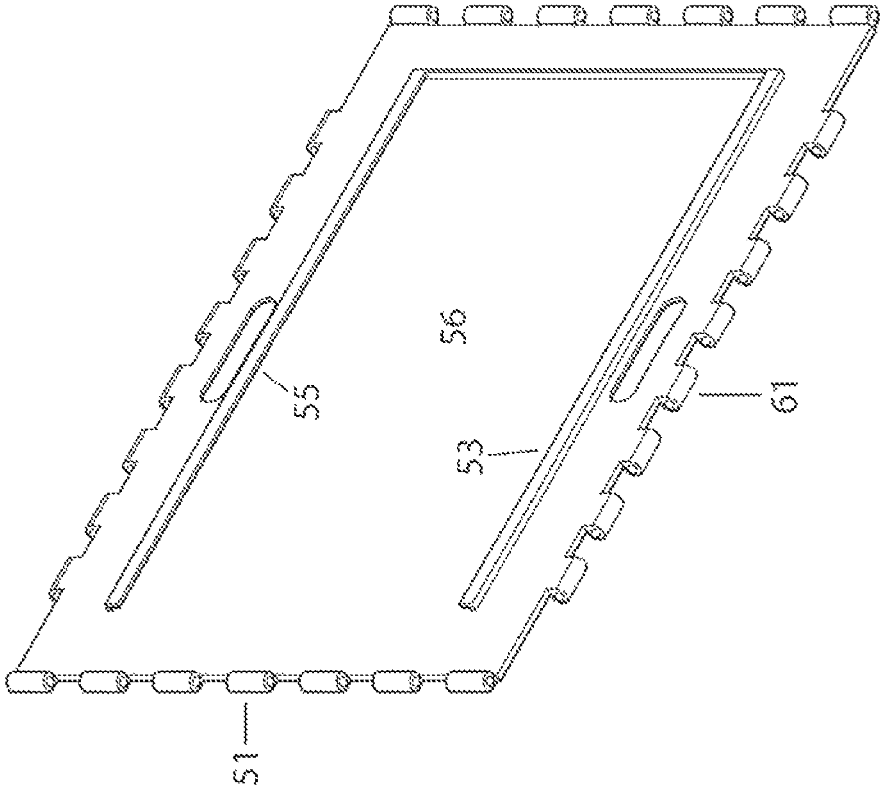
FIG. 14 shows an enlarged image of an alternative side component of a collapsible bin.

With regard to FIG. 14, shown is a side piece 63 of a bin as shown in FIG. 7. Side piece 63 further includes a plurality of interlocking hinge component 51 on each of the top and bottom and a plurality of interlocking hinge components 61 on each of the opposing sides. Side piece 63 may further include panel 56 for insertion of panels. Grooves 53 allow for the insertion and retention of potential informational panels. Upon assembly, adjacent side pieces are joined at vertical interlocking hinge present along the side of each side piece.

Figure 15:
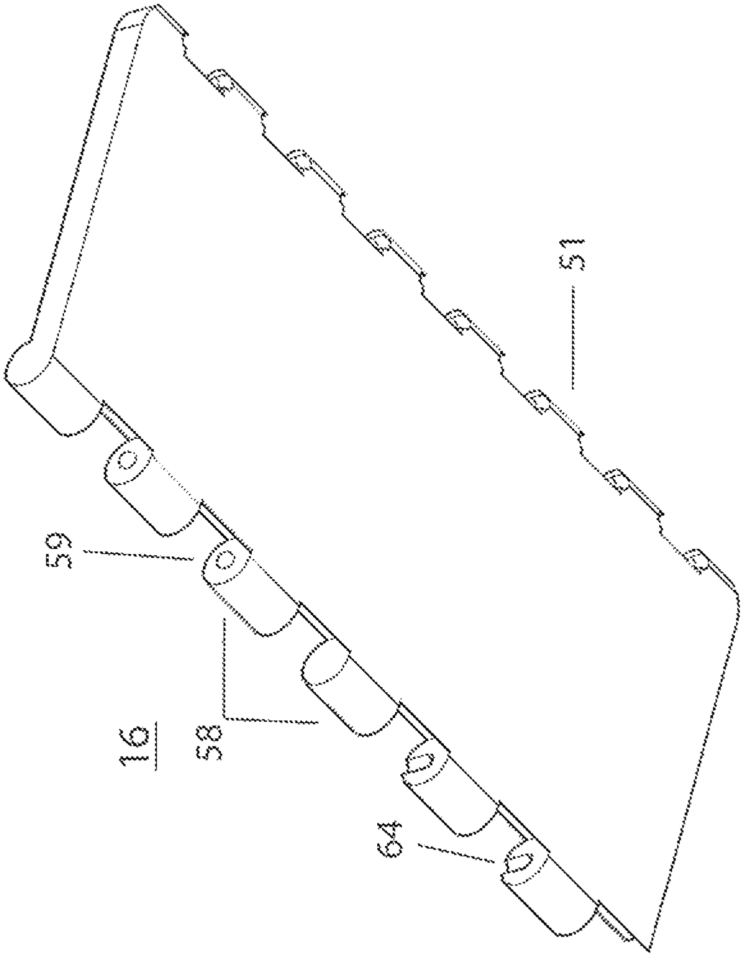
FIG. 15 shows an enlarged image of a bottom component of a collapsible bin.

With regard to FIG. 15, shown is one half piece 16 of a bottom piece of a bin as shown in FIG. 7. The one half piece 16 is further comprised of a plurality of a first type of hinge component 58 wherein hinge component 58 is further comprised of a protrusion 59 on one end of hinge component 58 and a groove 64 on the other end of hinge component 58. The opposite side of the one half piece 16 is comprised of a plurality of hinge components 51 which further include hinge pins (not shown).

Figure 16:
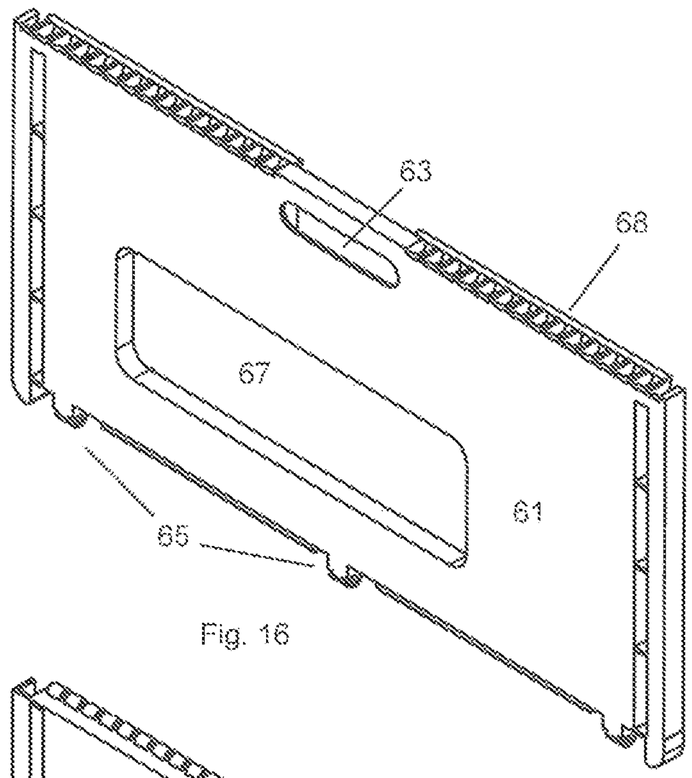
FIG. 16 shows enlarged image of an alternative lid component of a collapsible bin.
Figure 17:
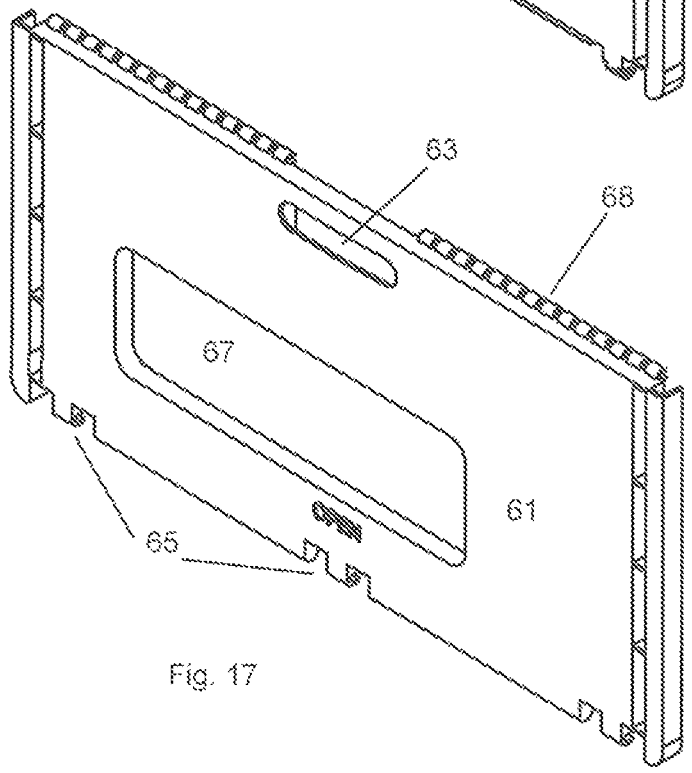
FIG. 17 shows enlarged image of an alternative lid component of a collapsible bin.

With regard to FIG. 16 and FIG. 17, shown is one half piece 61 of a top piece of a bin. The one half piece 61 is further comprised of a cutout 67 for deposit of materials into the bin and a small opening 63 for use as a handle. The side of one half piece 61 positioned closest to small opening 63 is further comprised of a first hinge type 68 and the opposite side of the one half piece 61 is comprised of a second hinge type 65. Each top piece is constructed of at least two layers of material, e.g. plastic by way of example only, reinforced by perpendicular supports therein. First hinge type 68 located on one side of one half piece is comprised of a set of protrusions. When the two lid pieces are positioned on top of a bin in use, the protrusions nest within corresponding openings that are sized to receive said protrusions. The nesting feature reinforces the lid when the lid halves are closed such that there is no give or movement of the lid pieces when the bin is in use. The second hinge type 65 located on the side of each half piece opposite of first hinge type 68 includes a hinge comprised of three protrusions that interlock with corresponding hinge protrusions located at the top edge of the side pieces (see FIG. 21). This embodiment includes a single large cut out in each half piece that is large enough to receive a variety of recyclable items.

Figure 18:
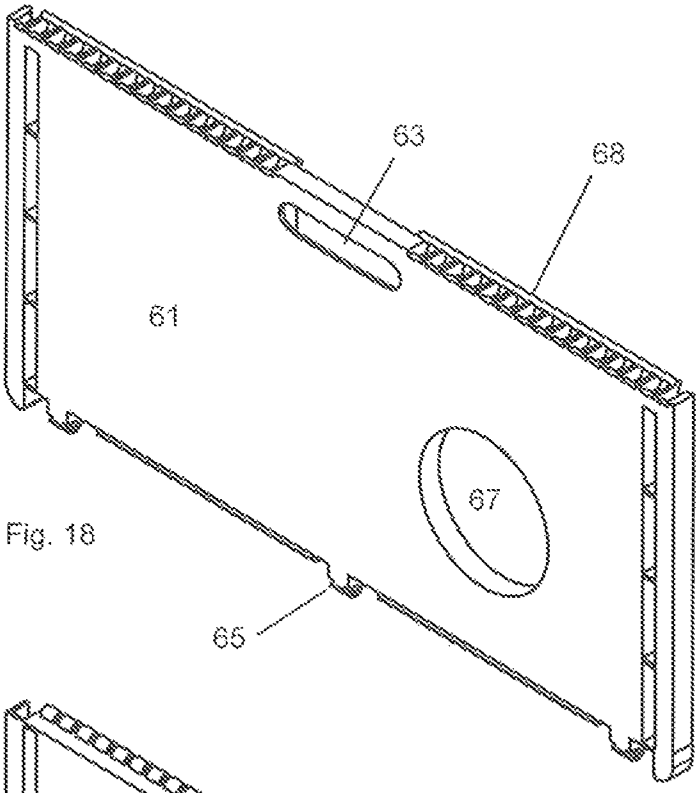
FIG. 18 shows enlarged image of an alternative lid component of a collapsible bin.
Figure 19:
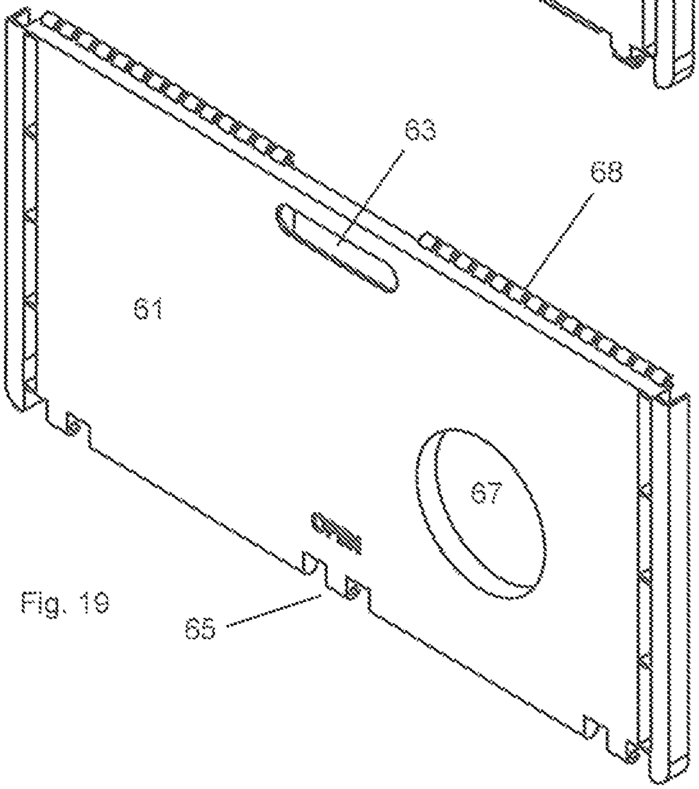
FIG. 19 shows enlarged image of an alternative lid component of a collapsible bin.

With regard to FIG. 18 and FIG. 19, shown is one half piece 61 of a top piece of a bin. The one half piece 61 is further comprised of a cutout 67 for deposit of materials into the bin and a small opening 63 for use as a handle. The side of one half piece 61 positioned closest to small opening 63 is further comprised of a first hinge type 68 and the opposite side of the one half piece 61 is comprised of a second hinge type 65. Each top piece is constructed of at least two layers of material, e.g. plastic by way of example only, reinforced by perpendicular supports therein. First hinge type 68 located on one side of one half piece is comprised of a set of protrusions. When the two lid pieces are positioned on top of a bin in use, the protrusions nest within corresponding openings that are sized to receive said protrusions. The nesting feature reinforces the lid when the lid halves are closed such that there is no give or movement along the central line of the lid pieces where the pieces are joined when the bin is in use. The second hinge type 65 located on the side of each half piece opposite of first hinge type 68 includes a hinge comprised of three protrusions that interlock with corresponding hinge protrusions located at the top edge of the side pieces (see FIG. 21). This embodiment includes a single round cut out in each half piece that is sized to receive a variety of recyclable beverage items.

Figure 20:
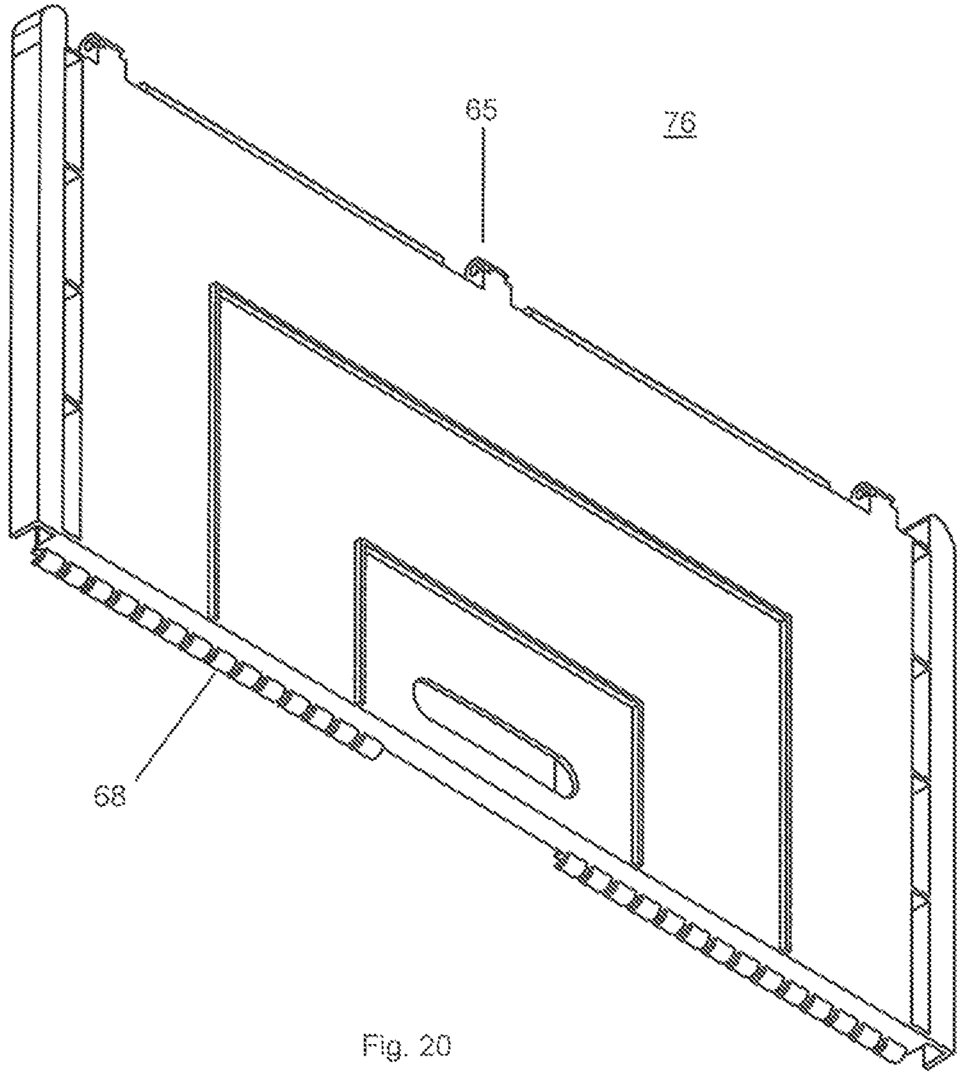
FIG. 20 shows an enlarged image of a bottom component of a collapsible bin.

With regard to FIG. 20, shown is one half piece 76 of a bottom piece of a bin as shown in FIG. 7. The one half piece 76 is further comprised of a plurality of a first hinge type 68 and the opposite side of the one half piece 76 is comprised of a second hinge type 65.

Figure 21:
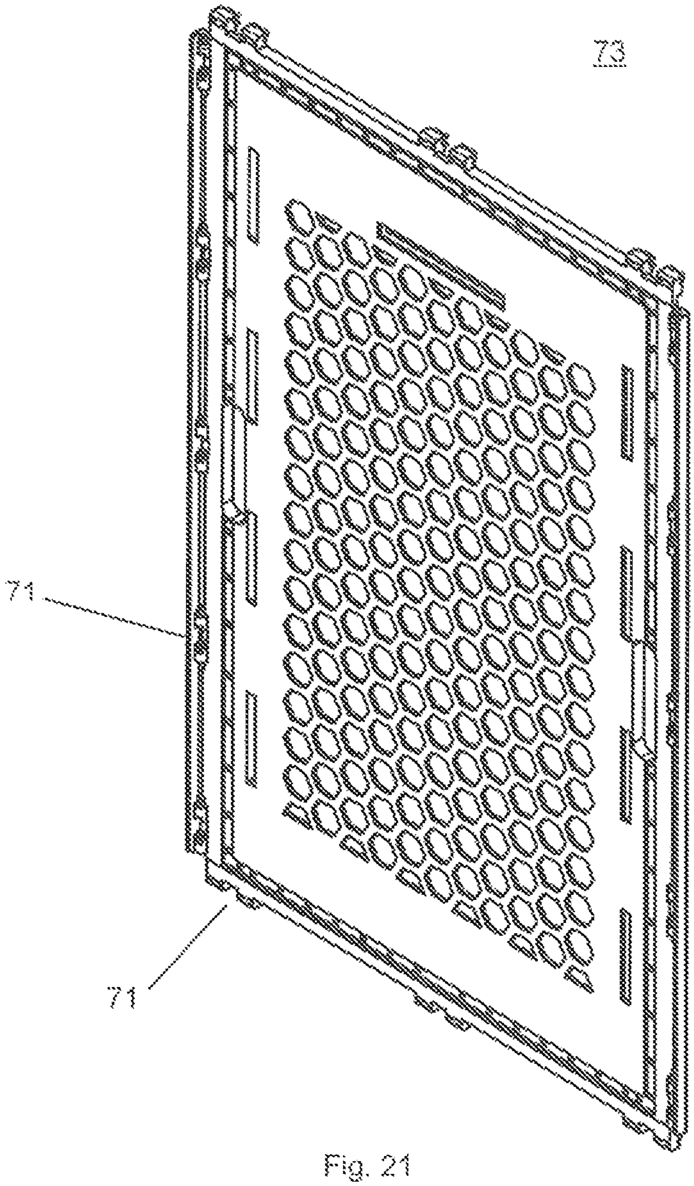
FIG. 21 shows an enlarged image of an alternative side component of a collapsible bin.

With regard to FIG. 21, shown is a side piece 73 of a bin as shown in FIG. 7. Side piece 73 further includes a plurality of interlocking hinge component 71 on each of the top and bottom and a plurality of interlocking hinge components 71 on each of the opposing sides. Side piece 73 may further include a honeycomb pattern of cutouts. The honeycomb pattern of cut outs provides reinforcement to the side walls of the bin while minimizing the amount of material required and thereby keeping the weight of the sides less than if the sides were comprised of a solid sheet of material. Upon assembly, adjacent side pieces are joined at vertical interlocking hinge present along the side of each side piece. When assembled each bin is comprised in part of two side pieces 73 positioned opposite each other. Hinges located at the top edge of each of side piece 73 correspond to the hinges 65 that form part of each one half top piece.

Figure 22:
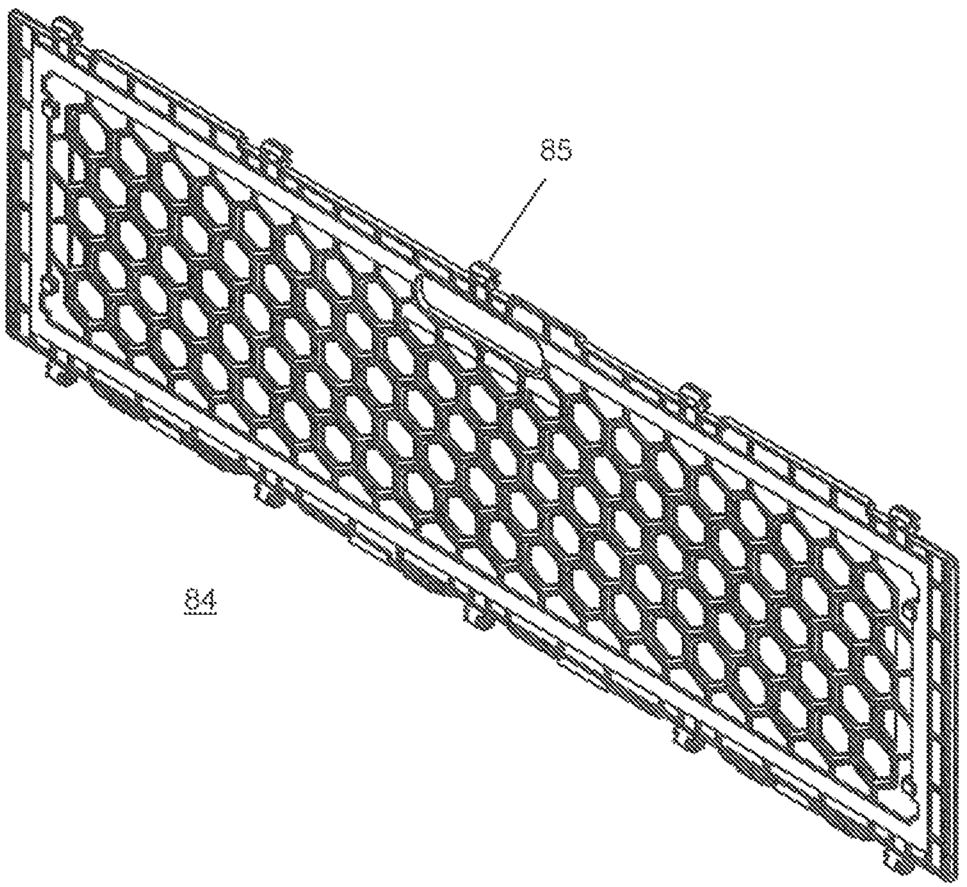
FIG. 22 shows an enlarged image of an alternative side component of a collapsible bin.

With regard to FIG. 22, shown is a side piece 84 of a bin as shown in FIG. 7. The side piece 84 is further comprised of a small opening 85 for use as a handle. The side piece 84 positioned closest to small opening 85 is further comprised of a plurality of hinge component 86. Side piece 84 may further include a honeycomb pattern of cutouts. The honeycomb pattern of cut outs provides reinforcement to the side walls of the bin while minimizing the amount of material required and thereby keeping the weight of the sides less than if the sides were comprised of a solid sheet of material. Upon assembly, adjacent side pieces are joined at vertical interlocking hinge present along the side of each side piece. When assembled each bin is comprised in part of two side pieces 84 positioned opposite each other. Hinges located at the side edge of each of side piece 84 correspond to the hinges 71 that is located along the side edges of side piece 73.

A key component of the present invention is the ability to fold in half, as many of the potential users/companies have limited accommodations to store the bins when events are in hiatus or when transporting to events or to other projects. Also consider oil companies moving between oil fields, construction companies moving between projects or ski resorts storing them during the off-season, as examples. The foldable function is able to decrease its width by reducing the final width to less than 10% of the expanded form, for transport and/or storage. When the bin is folded upon itself for transport, the width of the bin is reduced by 90% when compared to the width of the when fully expanded for use. The unit easily contracts simply by pulling upward on the top panels through the grasping holes on the top of the bin. With this vertical motion, the unit automatically and effortlessly collapses upon itself such that the collapsed bin will lie flat. Then, by rotating the unit 90 degrees on a horizontal axis and inserting hands through the second set of handholds on the side pieces of the bin, the folded bin is ready for tranquil pedestrian transport of one, two or possibly more bins, per person. The bins can be stacked flat on a standard pallet or vertically in a custom pallet or custom case.

Several hinge types comprise the complete unit of the present invention, functioning both horizontally and vertically. Depending on availability during manufacturing, the bin may employ different hinge styles and types. In one embodiment, the hinge may consist of a "snapping" or "interlocking" style in which the two opposing pieces are snapped together to create one operating hinge that may actuate anywhere from 0 degrees to typically up to 270 degrees but in some cases more.

In another embodiment, the hinge may consist of a "ball and socket" style in which the two opposing pieces are snapped together to create one operating hinge that may actuate anywhere from 0 degrees to typically up to 270 degrees but in some cases more. This style of hinge allows for the lid to be easily opened on one side, by disconnecting the hinge to allow access into a fully expanded bin to insert and/or replace bag liners.

In yet another case, the hinge may consist of a "hinge pin" style in which the two opposing pieces are placed or snapped together to create one operating hinge that may actuate anywhere from 0 degrees to typically up to 270 degrees but in some cases more. This style requires a pin to be inserted as the final piece to create an actuating hinge which could consist as one long hinge along a given side and subsequently one long pin or several hinges and several pins. The pin may be plastic, nylon or any given metal or alloy. A single complete bin could consist of one or any combination of hinges described herein.

In the case of any hinge, they are made in a modular fashion to be rigid and functioning when assembled, but also somewhat easily dissembled when required to swap a piece to morph the bin from one trash stream to another. For example a Trash/Trash single stream to a Trash/Recycling dual stream by changing one of the lid pieces which subsequently changes the receptacle shape and color of one side of the complete lid. Another reason to swap pieces would be to replace a damaged panel to fix a bin, opposed to replacing the entire unit.

One embodiment of the present invention provides a bin comprising:

a) a top piece;

b) a bottom piece; and c) a plurality of side pieces wherein the plurality of side pieces are substantially rectangular in shape and wherein the height of the side pieces is greater than the width of the side piece.

A further embodiment of the present invention provides a multi-purpose collapsible foldable bin, the bin comprising:

a) a top piece;

b) a bottom piece; and c) a plurality of side pieces wherein the plurality of side pieces are substantially rectangular in shape and wherein the height of the side pieces is greater than the width of the side piece, wherein the bin is collapsible such that the bin folds flat into a collapsed state having a width which is decreased by 90% of the width of the non-collapsed bin wherein the side pieces include a honeycomb pattern of cut outs and when folded the bin folds flat to a final width of less than 10% of the width of the fully expanded bin.

Another embodiment of the present invention provides a bin wherein the top piece and the bottom piece are further comprised of a horizontal hinge, the horizontal hinge being centrally positioned and effectively bisecting the piece respectively. The top piece and the bottom piece are further comprised of the partial components of an interlocking hinge along opposing edges of each piece and parallel to the horizontal hinge. In addition, the top piece is further comprised of a set of openings, one on each side and equidistant from the horizontal hinge.

Yet another embodiment of the present invention provides a bin wherein the top piece is further comprised of a plurality of cutouts wherein the cutouts are intended to allow for the deposit of items for collection in the bin. The openings may be square, rectangular, and circular or any shape desired.

A further embodiment of the present invention provides a bin wherein two opposing side pieces further include a plurality of interlocking hinge components on all four edges of the side pieces. Each side piece may include a plurality of openings or alternatively may be a solid panel piece. The plurality of interlocking hinge components may be further joined and secured with a plurality of hinge pins.

Still another embodiment of the present invention provides a bin wherein two opposing side pieces further include a plurality of interlocking hinge components at the vertical edges of the side pieces in addition to a horizontal hinge along the x-axis positioned centrally to the piece. Each side piece may include a plurality of openings or alternatively may be a solid panel piece. In an alternative embodiment the horizontal hinge of the solid panel side piece is further comprised of a single pin.

A further embodiment of the present invention provides a bin wherein the top piece and the bottom piece are rounded.

Yet another embodiment of the present invention provides a bin wherein the bin is capable of collapsing along the horizontal hinge to a flattened state for ease of transport.

Another embodiment of the present invention provides a bin wherein the bin is constructed from durable, lightweight plastic for ease of transport and ease of cleaning.

Still another embodiment of the present invention provides a bin wherein at least one side piece is further comprised of a means for receiving a signage piece. In a particular embodiment, the means for receiving information panels is comprised of a rail or edge under which the panels slides and is held securely in place.

A further embodiment of the present invention provides a bin wherein an integrated fastener means comprising a gasket ring positioned under the top piece wherein the fastener means captures a liner bag to hold the liner securely in place during use.

Yet another embodiment of the present invention provides for a bin having solid top already connected to the main body of the unit thereby protecting the trash/recycling from wildlife (birds) but also encouraging consumers in sustainable practices for recycling, composting or landfill via signage and the shape of the opening on the top of the lid.

Another embodiment of the present invention provides a bin wherein the top piece and the bottom piece are further comprised of a central hinge, the central hinge being an interlocking hinge. The top piece and the bottom piece are further comprised of the partial components of an interlocking hinge along opposing edges of each piece and parallel to the central hinge. In addition, the top piece is further comprised of a set of openings, one on each side and equidistant from the central hinge.

Yet another embodiment of the present invention provides a bin wherein the top piece is further comprised of a plurality of openings wherein the openings are intended to allow for the deposit of items for collection in the bin. The openings may be square, rectangular, and circular or any shape desired.

A further embodiment of the present invention provides a bin wherein two opposing side pieces further include partial components of an interlocking hinge at all four edges of the side pieces. Each side piece may include a plurality of openings or alternatively may be a solid panel piece.

Still another embodiment of the present invention provides a bin wherein two opposing side pieces further include partial components of an interlocking hinge at the vertical edges of the side pieces in addition to a central hinge along the x-axis. Each side piece may include a plurality of openings or alternatively may be a solid panel piece. In an alternative embodiment the central hinge of the solid panel piece is comprised of a single pin.

A further embodiment of the present invention provides a bin wherein the top piece and the bottom piece are rounded.

Yet another embodiment of the present invention provides a bin wherein the bin is capable of folding down the center to a flattened state for ease of transport.

Another embodiment of the present invention provides a bin wherein the bin is constructed from durable, lightweight plastic for ease of transport and ease of cleaning.

Still another embodiment of the present invention provides a bin wherein at least one side piece is further comprised of a means for receiving a signage piece. In a particular embodiment, the means is comprised of a rail type system.

A further embodiment of the present invention provides a bin wherein an integrated fastener means comprising a gasket ring positioned under the top piece wherein the fastener means captures a liner bag to hold the liner securely in place during use.

Yet another embodiment of the present invention provides for a bin having solid top already connected to the main body of the unit thereby protecting the trash/recycling from wildlife (birds) but also encouraging consumers in sustainable practices for recycling, composting or landfill via signage and the shape of the opening on the top of the lid.

In yet another aspect, the size of the receptacles can be varied to service different needs. For example the unit size can be reduced to 13 or 6 gallons, more/less, to serve temporary or permanent office locations. The size could also be increased to handle more industrial needs.

All of the features disclosed in this specification may be combined in any combination. Each feature disclosed in this specification may be replaced by an alternative feature serving the same, equivalent, or similar purpose. Thus, unless expressly stated otherwise, each feature disclosed is only an example of a generic series of equivalent or similar features. As used in this specification and in the appended claims, the singular forms include the plural forms. For example the terms "a," "an," and "the" include plural references unless the content clearly dictates otherwise. Additionally, the term "at least" preceding a series of elements is to be understood as referring to every element in the series. The inventions illustratively described herein can suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the future shown and described or any portion thereof, and it is recognized that various modifications are possible within the scope of the invention claimed. Thus, it should be understood that although the present invention has been specifically disclosed by preferred embodiments and optional features, modification and variation of the inventions herein disclosed can be resorted by those skilled in the art, and that such modifications and variations are considered to be within the scope of the inventions disclosed herein. The inventions have been described broadly and generically herein. Each of the narrower species and subgeneric groupings falling within the scope of the generic disclosure also form part of these inventions. This includes the generic description of each invention with a proviso or negative limitation removing any subject matter from the genus, regardless of whether or not the excised materials specifically resided therein. In addition, where features or aspects of an invention are described in terms of the Markush group, those schooled in the art will recognize that the invention is also thereby described in terms of any individual member or subgroup of members of the Markush group. It is also to be understood that the above description is intended to be illustrative and not restrictive. Many embodiments will be apparent to those of in the art upon reviewing the above description. The scope of the invention should, therefore, be determined not with reference to the above description, but should instead be determined with reference to the appended claims, along with the full scope of equivalents to which such claims are entitled. Those skilled in the art will recognize, or will be able to ascertain using no more than routine experimentation, many equivalents to the specific embodiments of the invention described. Such equivalents are intended to be encompassed by the following claims.

The invention claimed is:

1. A multi-purpose foldable bin, the bin comprising:

a) a top piece wherein the top piece comprises a plurality of hinge components on each opposing end parallel to a central line and further comprising at least one opening for the deposit of materials wherein the openings are sized for the passing through of trash and recyclable containers;

b) a bottom piece; and c) a plurality of side pieces wherein the plurality of side pieces are substantially rectangular in shape, the top piece, the bottom piece and the plurality of side pieces being attached and forming the bin, wherein a height of each of the plurality of side pieces is greater than a width of each of the plurality of side pieces, wherein as least two side pieces of the plurality of side pieces comprises a honeycomb pattern of cut outs, wherein the top piece, the bottom piece and one or more of the side pieces are bisected into two equal halves along a central hinge such that pulling upward on the top pieces causes the bin to collapse and fold in half and wherein the bin easily and automatically folds flat to a width of less than 10% of the width of the fully expanded bin.

2. The multi-purpose bin of claim 1, wherein the top piece further comprises at least one handle comprising one or more cutouts positioned on either side of the central line.

3. The multi-purpose bin of claim 1, wherein the bottom piece comprises a plurality of hinge components on each of its opposing edges parallel to the central hinge.

4. The multi-purpose bin of claim 1, wherein the plurality of side pieces comprises a first side piece that includes a plurality of hinge components on each of four sides of the first side piece.

5. The multi-purpose bin of claim 4, wherein the first side piece and a fourth side piece comprise said honeycomb pattern of cutouts or a different shape of cutouts.

6. The multi-purpose bin of claim 4, wherein a second side piece comprises a plurality of hinge components on at least two sides of the second side piece.

7. The multi-purpose bin of claim 6, wherein the plurality of hinge components on at least two sides of the first side piece are positioned on each of opposing sides parallel to a central vertical hinge.

8. The multi-purpose bin of claim 1, wherein a third side piece comprises a plurality of hinge components on at least two sides of the third side piece.

9. The multi-purpose bin of claim 8, wherein the third side piece comprises a plurality of hinge components on each of the four sides of the third side piece.

10. The multi-purpose bin of claim 8, wherein the third side piece is comprised of an outer frame surrounding the honeycomb pattern of cutouts.

11. The multi-purpose bin of claim 1, wherein a fourth side piece comprises a plurality of hinge components on at least two sides of the fourth side piece.

12. The multi-purpose bin of claim 11, wherein the fourth side piece comprises a plurality of hinge components on each of the four sides of the fourth side piece.

13. The multi-purpose bin of claim 11, wherein the fourth side piece is comprised of an outer frame surrounding the honeycomb pattern of cutouts.

14. The multi-purpose bin of claim 1, wherein the top piece and bottom piece are square.

15. The multi-purpose bin of claim 1, wherein the top piece and bottom piece is circular.

16. The multi-purpose bin of claim 1, further comprising a bag fastener means comprising a gasket ring positioned under the top piece.

* * * * *